(12) United States Patent
Post et al.

(10) Patent No.: US 8,850,160 B2
(45) Date of Patent: Sep. 30, 2014

(54) ADAPTIVE WRITE BEHAVIOR FOR A SYSTEM HAVING NON-VOLATILE MEMORY

(75) Inventors: Daniel J. Post, Campbell, CA (US); Brian Sutton, San Jose, CA (US)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 12/861,687

(22) Filed: Aug. 23, 2010

(65) Prior Publication Data

US 2012/0047315 A1 Feb. 23, 2012

(51) Int. Cl.
*G06F 12/00* (2006.01)
*G06F 12/02* (2006.01)

(52) U.S. Cl.
CPC ................... *G06F 12/0246* (2013.01)
USPC ............................ 711/209; 711/170; 711/202

(58) Field of Classification Search
CPC .. G06F 12/023; G06F 12/0292; G06F 12/109
USPC .......................................... 711/170, 202, 209
See application file for complete search history.

(56) References Cited

U.S. PATENT DOCUMENTS

| | | | |
|---|---|---|---|
| 2006/0136682 A1* | 6/2006 | Haridas et al. | 711/154 |
| 2008/0104309 A1 | 5/2008 | Cheon et al. | |
| 2009/0172248 A1* | 7/2009 | You | 711/103 |
| 2009/0198947 A1 | 8/2009 | Khmelnitsky et al. | |
| 2009/0310412 A1 | 12/2009 | Jang et al. | |
| 2010/0169544 A1* | 7/2010 | Eom et al. | 711/103 |

* cited by examiner

*Primary Examiner* — Gurtej Bansal
(74) *Attorney, Agent, or Firm* — Van Court & Aldridge LLP

(57) ABSTRACT

Systems and methods are disclosed for adaptive writing behavior for a system having non-volatile memory ("NVM"). A memory interface of a system can be configured to determine whether a write preference of the system is skip-sequential. In response to determining that the write preference is skip-sequential, the memory interface can sequentially program data to a first set of pages of a block of the NVM. In addition, the memory interface can sequentially pre-merge gaps between the first set of pages with one or more pages of a data block. Moreover, the memory interface can be configured to switch to an alternative programming state in response to determining that at least one condition has been satisfied. For example, the memory interface can stop programming data sequentially, and instead program data in the order that the data is received from a file system.

16 Claims, 7 Drawing Sheets

ADAPTIVE WRITE BEHAVIOR FOR A SYSTEM HAVING NON-VOLATILE MEMORY

FIELD OF THE INVENTION

This can relate to adaptive writing behavior for a system having non-volatile memory.

BACKGROUND OF THE DISCLOSURE

NAND flash memory, as well as other types of non-volatile memories ("NVMs"), are commonly used for mass storage. For example, electronic devices such as portable media players or cellular telephones often include raw flash memory or a flash card to store music, videos, and other media.

The NVM may include one or more blocks for storing data. Each block can correlate to a particular logical range in a logical space, sometimes referred to as a "logical block", which can be allocated to one or more files. For example, pages of a block can store data corresponding to particular sectors of a logical block. In some cases, a memory interface of the electronic device can map logical addresses provided by a file system to corresponding physical addresses where data is stored in one or more pages of a block.

In some systems, two different types of blocks may be used to store data. One type, referred to as "data blocks", can be used to provide long-term storage of data. Although read and erase operations can be performed on these data blocks, programming operations can no longer be performed. In contrast, a second type, referred to as "log blocks", can serve as temporary storage for new data that is being programmed to the NVM. In particular, the use of log blocks can reduce write amplification when a system performs file allocation table ("FAT") updates.

Due to storage space constraints, a memory interface may need to eventually reclaim or garbage collect one or more log blocks in order to reclaim space on the NVM. In order to reclaim these log blocks, the memory interface may need to merge a log block with a data block by copying the newest version of data into a new block. Once the merge has completed, the memory interface can erase the log and data blocks. Unfortunately, these memory operations can negatively impact system efficiency and increase memory wear over time, especially when regular writes are being performed on a fragmented logical space.

SUMMARY OF THE DISCLOSURE

Systems and methods are disclosed for adaptive writing behavior for a system having non-volatile memory ("NVM"). In some embodiments, the system can include a NVM interface, sometimes referred to herein as a "memory interface", for accessing the NVM. The memory interface may be configured to handle write commands to write data to the NVM.

An adaptive writing behavior can be implemented when the memory interface is writing sectors of data received from a file system (e.g., a file system stored on the device itself or a file system stored on a host device) to a block of the NVM. In some embodiments, the memory interface can assume that the writes that are received from the file system are skip-sequential. As used herein, "skip-sequential" can refer to a scenario where each logical address that is received is strictly greater than the logical address of the last sector written to a block, but the received logical addresses are not in an absolute sequential order.

For example, the memory interface can assume that the received sectors have increasing logical addresses, and, as a result, sequentially program the received sectors to one or more pages of the block by default. That is, one or more pages of the block can be sequentially mapped to one or more respective sectors. In some embodiments, the received sectors can be previously free sectors of a logical block that have been allocated to a file that is currently being written (e.g., a new media file generated by an application), and a portion of the pages of the block that corresponds to these sectors can be referred to as a "first set of pages". As used herein, a "logical block" can correspond to a particular logical range in a logical space that can be allocated to one or more files.

In addition, while sequentially programming the sectors of data, the memory interface can pre-merge gaps between the first set of pages. In some cases, the memory interface can pre-merge the gaps by performing in-place merges of the block with a data block. As used herein, a "data block" is a block of a NVM that can be used to provide long-term storage of data.

For example, when the memory interface receives a sector having a logical address (e.g., a new logical address) that does not immediately follow the logical address of the last sector written to the block (e.g., a last logical address), the memory interface can perform a pre-merge operation by copying one or more pre-allocated sectors (e.g., sectors that have been pre-allocated to at least one other file) from a data block to the block. The pre-allocated sectors can have logical addresses that are above the last logical address and below the new logical address. After the pre-merge operation is complete, the memory interface can continue programming sectors in sequential logical address order, starting with the sector having the new logical address.

This writing process can improve the overall efficiency of system writes. In particular, the block that is being programmed can be automatically turned into a data block once the block has been completely filled. As a result, fewer memory operations (e.g., read, program, and erase operations) need to be performed. This process is particularly efficient for systems with fragmented logical blocks.

In some embodiments, in response to detecting non-skip-sequential writes, the system can automatically switch to an alternative programming state, which can involve the use of log blocks and writing data to the log blocks in the order that the data is received. As used herein, a "non-skip-sequential write" can refer to a scenario where a system is performing a write operation on an open block, in which the logical address of the write operation that has just been received is not strictly greater than the logical address of the last sector written to the block. In addition, as used herein, a "log block" is a block of a NVM that can serve as temporary storage for new data that is being programmed to the NVM.

For example, the memory interface can receive a write command to write data that corresponds to a sector of a logical block. In response to receiving the write command, the memory interface can detect if the file system is issuing non-skip-sequential writes by determining whether at least one condition has been satisfied. For example, the memory interface can determine that the at least one condition has been satisfied (e.g., the system is issuing non-skip-sequential writes) based on detecting that a logical address of the received sector is lower than or the same as a logical address corresponding to the last programmed page of the block (e.g., the sector is lower than or the same as the sector corresponding to the last programmed page).

In response to determining that the at least one condition has been satisfied, the memory interface can switch to an alternative programming state. For example, the memory interface can stop programming data sequentially to the pages of the block and pre-merging the data. Instead, the memory interface can program data to the block in the order that the data is received.

In some embodiments, in order to avoid having to switch to an alternative programming state, the memory interface can first determine if a write preference of a system (e.g., a file system) is skip-sequential. The memory interface can determine that the write preference of the system is skip-sequential by, for example, detecting that a flag bit associated with a file is set to skip-sequential writes, detecting that no flag bit is associated with the file, detecting that a mode of the memory interface is set to skip-sequential writes, using any other suitable approach, and/or any combination thereof.

In some embodiments, the memory interface can provide for exceptions to the default state of programming data sequentially to the NVM. For example, the memory interface can monitor the type of write command that is received. In particular, if the write command is associated with file allocation table ("FAT") updates, the memory interface can maintain a log block and program data to the log block in the order that the data is received.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
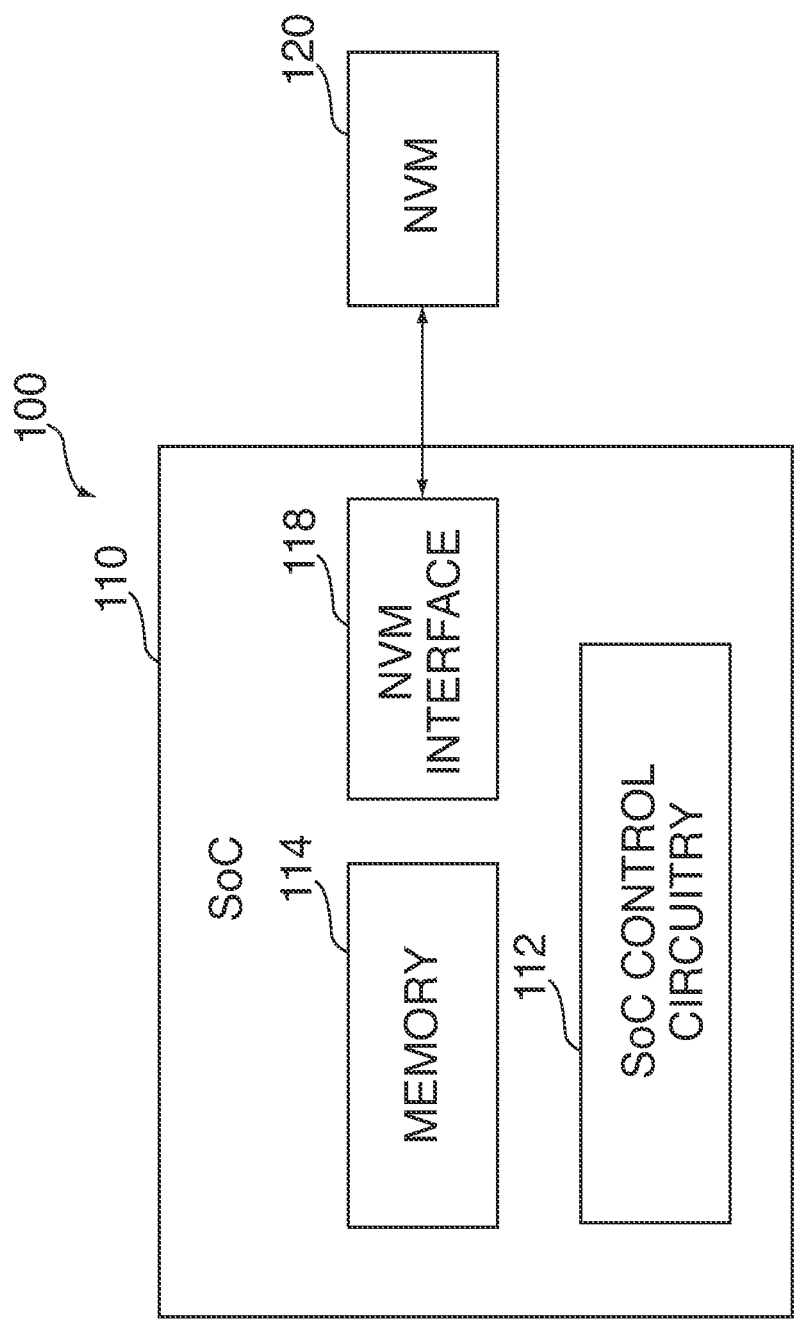
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof.

NVM 120 can be organized into "blocks", which is the smallest erasable unit, and further organized into "pages", which can be the smallest unit that can be programmed or read. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

SoC 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry".

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write commands to the target device.

Figure 2:
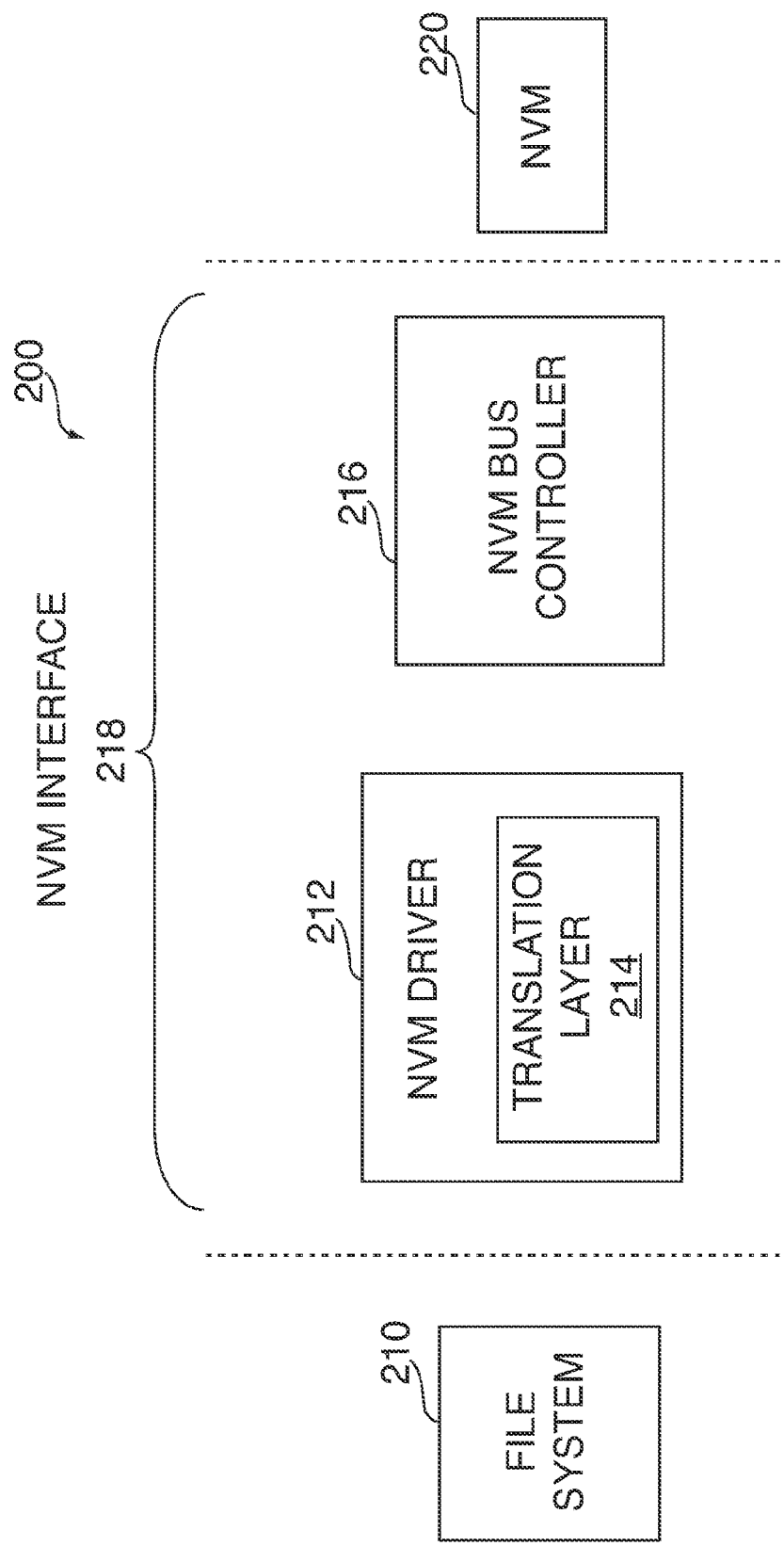

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system and may be part of the operating system of electronic device 200 (e.g., part of SoC control circuitry 112 of FIG. 1). In some embodiments, file system 210 may include a flash file system, which provides a logical to physical mapping of pages. File system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and erase requests). For example, NVM driver 212 or translation layer 214 can issue commands to bus controller 216 to merge various blocks of NVM 220. Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, error correcting code ("ECC") data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. For example, the metadata may contain a flag that indicates whether the stored data is good data.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. For example, in embodiments where NVM interface 218 maps logical sectors directly to physical pages, NVM interface 218 may store logical-to-physical mappings in pages in the NVM.

Figure 3:
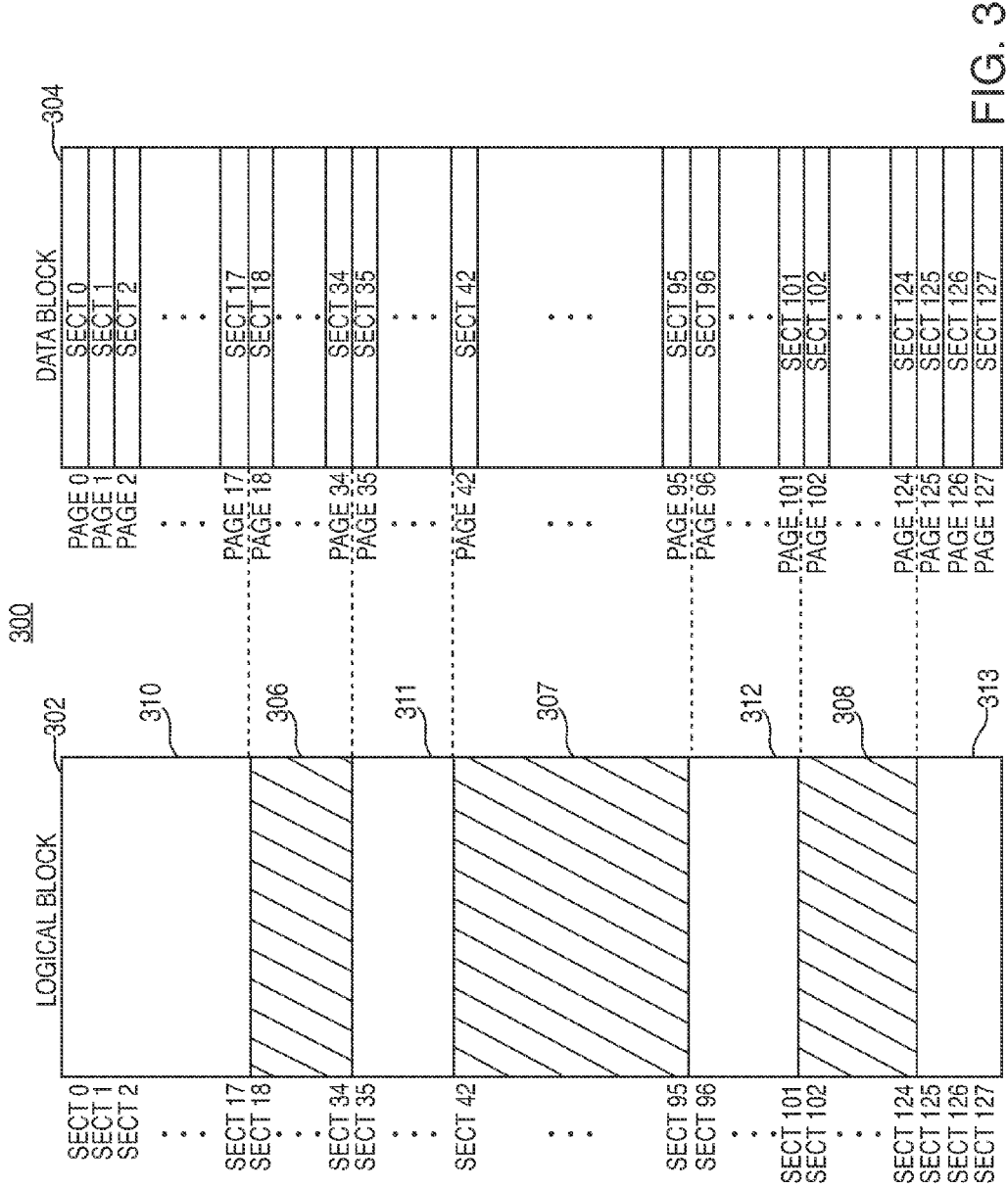
FIG. 3 is an illustrative mapping between sectors of a logical block to pages of a data block in accordance with various embodiments of the invention.

Referring now to FIG. 3, an illustrative mapping 300 between sectors of logical block 302 and pages of data block 304 is shown. In order to access data stored in a NVM (e.g., NVM 120 of FIG. 1 or NVM 220 of FIG. 2), a file system (e.g., file system 210 of FIG. 2) can communicate with a NVM interface (e.g., NVM interface 118 of FIG. 1 or NVM interface 218 of FIG. 2) in terms of sectors and their associated logical addresses (e.g., a logical page address or a logical block address ("LBA")).

In some embodiments, a range of sectors and their associated LBAs can be grouped into a logical range in a logical space, sometimes referred to as a "logical block". For example, as shown in FIG. 3, logical block 302 can include sectors 0-127 and associated LBAs 0-127. Although each LBA is discussed in FIG. 3 as being associated with one sector, persons skilled in the art will appreciate that each LBA can be associated with one or more sectors.

In some cases, some sectors of logical block 302 (e.g., sectors in regions 306-308) may have already been allocated by a file system to one or more files. These sectors may be referred to as "pre-allocated sectors". Other sectors of logical block 302 (e.g., sectors in regions 310-313), however, may be free and available for the file system to allocate to new files. For example, the file system can allocate these free sectors to one or more new files generated by a video application (e.g., files used to store newly recorded video files).

In some embodiments, logical block 302 can correspond to one or more physical blocks of the NVM, where each of the one or more physical blocks can correspond to a range of LBAs that are associated with logical block 302 (e.g., LBAs 0-127). Persons skilled in the art will appreciate that each page of a physical block can map to one or more sectors of logical block 302 (e.g., each page of a block can map to two sectors of logical block 302), and correspondingly each page of the block can map to the LBAs that are associated with the one or more sectors. For the sake of simplicity, however, the following discussion assumes that each sector maps to a single page.

In one embodiment, logical block 302 can correspond to data block 304. As used herein, a "data block" can be any block in a NVM that is capable of providing for long-term storage of data.

For example, data in logical block 302 can be stored contiguously in data block 304. That is, pages of data block 304 can be sequentially mapped to the sectors of logical block 302 (e.g., sequential pages of data block 304 can be mapped to sectors with sequential logical addresses). As shown in FIG. 3, sectors 0-127 can be mapped to pages 0-127, respectively, where, for instance, page 0 of data block 304 can map to sector 0 of logical block 302, page 1 of data block 304 can map to sector 1 of logical block 302, page 2 of data block 304 can map to sector 2 of logical block 302, etc.

Figure 4:
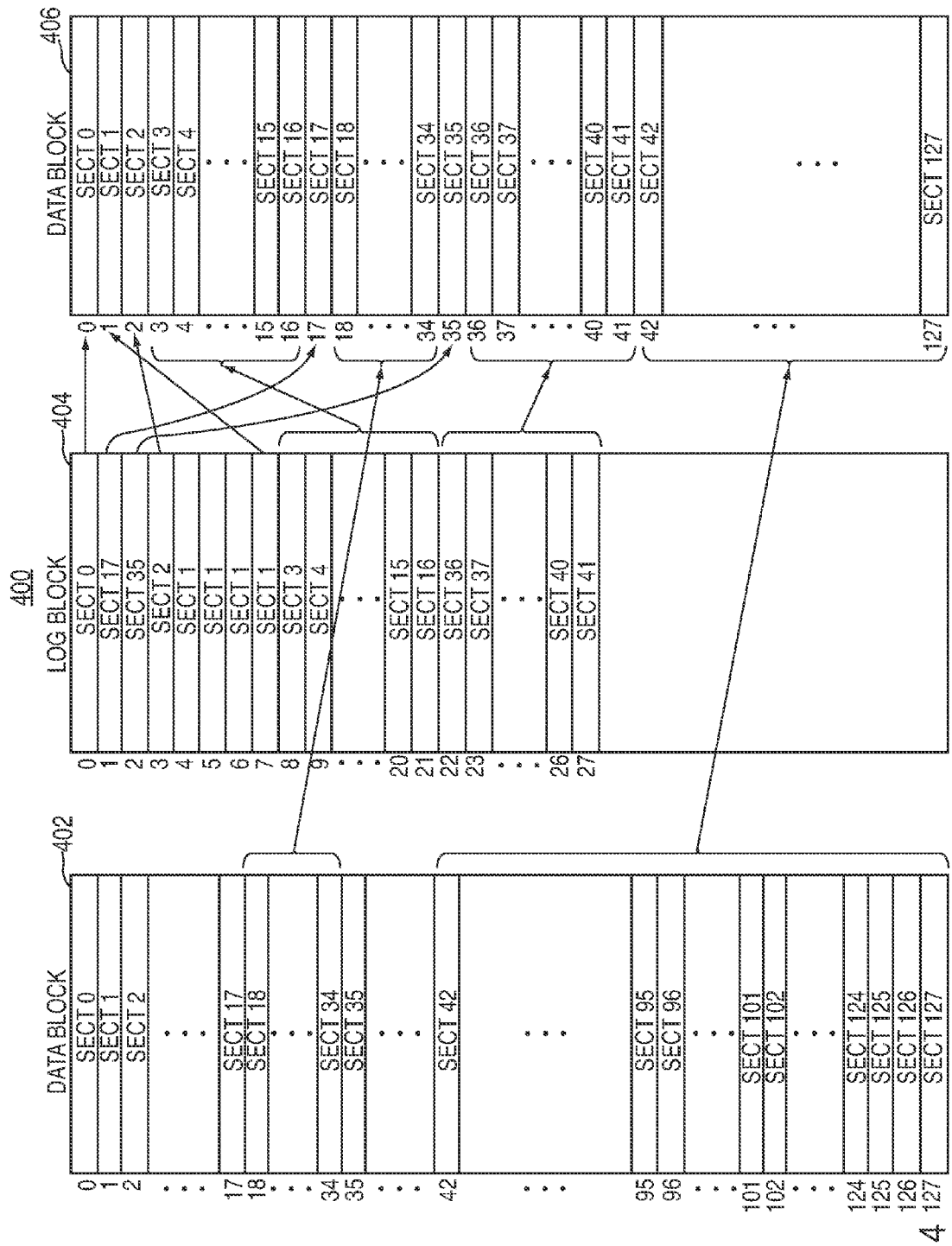
FIG. 4 is an illustrative graphical view of programming data using data blocks and a log block in accordance with various embodiments of the invention.
Figure 5:
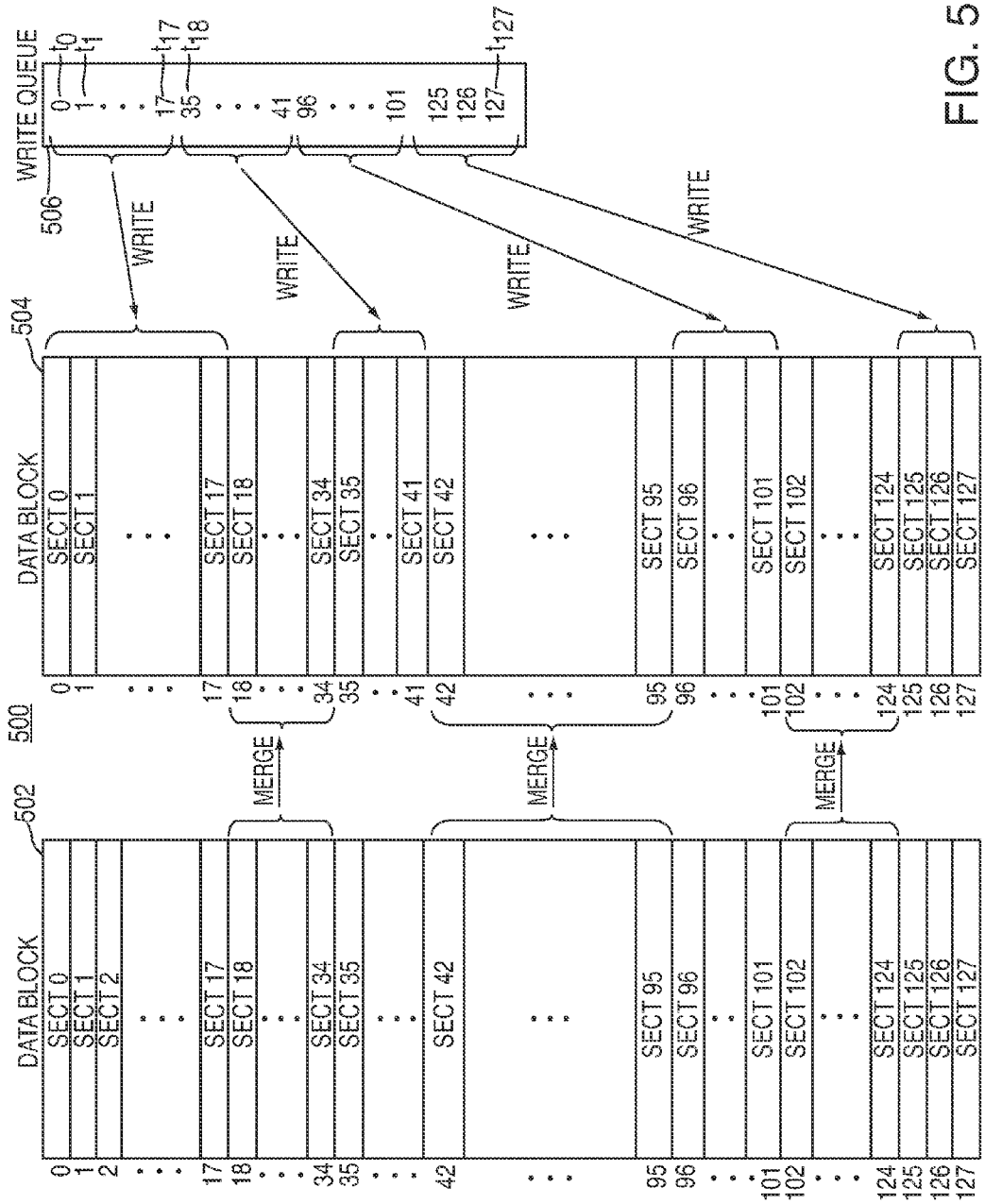
FIG. 5 is an illustrative graphical view of programming data in conjunction with performing in-place merges in accordance with various embodiments of the invention.
Figure 6:
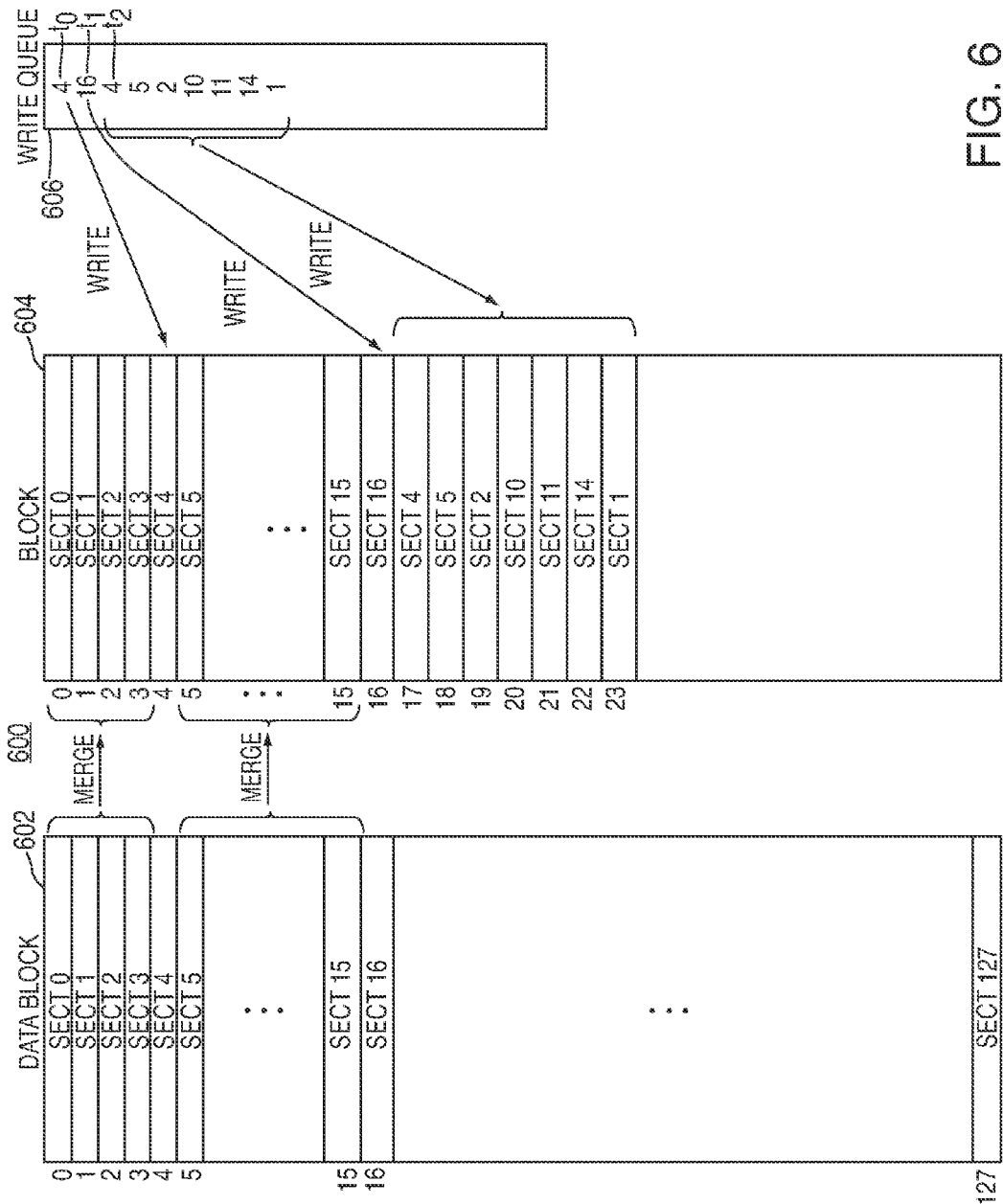
FIG. 6 is an illustrative graphical view of programming in multiple programming states in accordance with various embodiments of the invention.

In some embodiments, new data received from the file system can be stored in a new block. Turning now to FIGS. 4-6, various approaches for programming new data to a NVM are shown. It will be understood that, for the sake of clarity, the various blocks shown in FIGS. 4-6 are not drawn to scale.

Turning first to FIG. 4, an illustrative graphical view 400 of programming data using data blocks 402 and 406 and log block 404 is shown. Data block 402 can be the same as or substantially similar to data block 304 (FIG. 3), and may include data for all sectors of a particular logical block (e.g., logical block 302 of FIG. 3). In contrast, log block 404 may only store data for a subset of the sectors for the same logical block. As a result, although data block 402 and log block 404 may correspond to the same logical block, these two blocks can be located in two different physical locations on a NVM (e.g., NVM 120 of FIG. 1 or NVM 220 of FIG. 2). For example, data block 402 and log block 404 can be located on two different physical blocks and/or two different super blocks of the NVM. As used herein, a "log block" can be any block in the NVM that can serve as temporary storage for data that is being programmed to the NVM.

In some cases, in response to receiving new data from a file system (e.g., file system 210 of FIG. 2), a NVM interface (e.g., NVM interface 118 of FIG. 1 or NVM interface 218 of FIG. 2) can use log block 404 for storing the newly received data. In some embodiments, the NVM interface can program data into the pages of log block 404 in the order that the data is received from the file system.

For example, as shown in FIG. 4, the NVM interface may have already programmed data into pages 0-27 of log block 404. For instance, page 0 can store sector 0, page 1 can store sector 17, page 2 can store sector 35, etc. At a later point in time, the NVM interface may determine that log block 404 needs to be reclaimed. As used herein, the process of "reclaiming" a block can refer to the step of copying stored data from the block in order to invalidate the data. Once all of the memory locations in a block have been invalidated, the NVM interface can perform an erase operation on the block (e.g., the translation layer may direct the bus controller to perform an erase operation). After data stored in the block has been copied and the block has been erased, the pages of the block can be used to store new data received from the file system, for example.

The NVM interface may determine that log block 404 needs to be reclaimed based on any number of factors. For example, the NVM interface may have determined that additional space needs to be reclaimed on the NVM. As another example, the NVM interface may have determined that the number of open blocks on the NVM exceeds a pre-determined threshold.

In order to reclaim log block 404, the NVM interface can first locate the newest version of data corresponding to each sector of the logical block on either data block 402 or log block 404. After locating the newest version of data, the NVM interface can sequentially copy the newest version of data to a new data block 406, thereby invalidating data on both data block 402 and log block 404. Once all of the pages in data block 402 and log block 404 have been invalidated, the NVM interface can erase the data stored on data block 402 and log block 404.

For instance, in the example shown in FIG. 4, page 0 of data block 406 can include the newest version of data corresponding to sector 0, which can be copied from page 0 of log block 404 to page 0 of data block 406. Similarly, page 1 of data block 406 can include the newest version of data corresponding to sector 1. Although multiple copies of sector 1 are stored in pages 4-7 of log block 404, the newest version of data corresponding to sector 1 is stored in the bottom-most page (e.g., page 7 of log block 404). Thus, the NVM interface can copy the data stored in page 7 of log block 404 to page 1 of data block 406.

The process of copying data from log block 404 to data block 406 can continue until the NVM interface fails to find one or more sectors of data in log block 404. This may be an indication that the newest versions of data corresponding to these sectors are stored in data block 402. For example, upon reaching sectors 18-34, the NVM interface may fail to find data corresponding to sectors 18-34 in log block 404. As a result, the NVM interface may copy data corresponding to sectors 18-34 from pages 18-34 of data block 402 to respective pages 18-34 of data block 406.

The NVM interface can continue to merge data from data block 402 and log block 404 until all sectors 0-127 of the logical block have been copied to data block 406. At that point, the NVM interface can erase the data stored on data block 402 and log block 404.

The system efficiency and memory wear of this writing and merging process may vary depending on one or more factors. For example, this process can be fairly efficient if multiple non-skip-sequential writes are being performed on a block. As used herein, a "non-skip-sequential write" can refer to a scenario where a system is performing a write operation on an open block, in which the logical address of the write operation is not strictly greater than the logical address of the last sector written to the block.

For instance, a system may maintain a file allocation table ("FAT") in order to keep track of memory allocations associated with one or more files. During FAT updates, there may be multiple small and random writes in order to update individual FAT entries. In such a scenario, the log block may be continuously programmed, and it may therefore be preferable to group all of the programming operations together and keep the log block open for as long as possible (e.g., until additional space needs to be reclaimed). As another example, this process may be efficient for writes performed on non-fragmented logical blocks. For instance, the writes may be performed on sectors near the end of a logical block. Consequently, because of the manner in which the data is arranged on the data and log blocks, the merging process can be performed efficiently. Unfortunately, in systems with fragmented logical blocks, the additional copy and erase operations caused by the writing and merging process can reduce system efficiency and increase memory wear.

Accordingly, instead of waiting to merge the data until a log block needs to be reclaimed, the NVM interface can perform in-place merges of the data block and the log block. As used herein, "in-place merges" can refer to a process where a system can sequentially program data into a log block by assuming that the sectors of data received from a file system have increasing logical addresses.

By performing in-place merges, a system can avoid having to perform a merge operation on a log block at a later time. In particular, if the log block has been filled and the data stored on the log block have sequential logical addresses, the log block can be automatically converted to a regular data block without requiring any additional merge operations. As a result, fewer memory operations (e.g., read, program, and erase operations) need to be performed.

In-place merges may be particularly efficient when a system is issuing skip-sequential writes. As used herein, "skip-sequential writes" can refer to a scenario where each logical address received from a file system is strictly greater than the logical address of the last sector written to a block, but the received logical addresses are not in an absolute sequential order. That is, there may be gaps between at least some of the logical addresses received from the file system.

For example, when an electronic device is generating its own content, a file system can generate skip-sequential writes to one or more logical blocks of a logical space. For instance, a video camera application of a device may record video on skip-sequential free sectors of one or more logical blocks. Thus, responsive to requests from a video camera application, the file system can generate skip-sequential writes inside the device. The electronic device may be an iPod Nano™ made available by Apple Inc. of Cupertino, Calif., an iPod Shuffle™ made available by Apple Inc. of Cupertino, Calif., or any other device capable of independently generating and writing data to its NVM.

As another example, a host device can generate skip-sequential writes when the host is syncing up one or more media files on a media storage device. In these instances, the NVM interface can take advantage of the skip-sequential writes in order to perform in-place merges. As such, system write performance can be improved, particularly for systems with fragmented logical blocks.

FIG. 5 is an illustrative graphical view 500 of programming data in conjunction with performing in-place merges. An NVM interface (e.g., NVM interface 118 of FIG. 1 or NVM interface 218 of FIG. 2) can write sectors of data received from a file system (e.g., a file system stored on the device itself or a file system stored on a host device) to a block (e.g., data block 504) of the NVM. In some embodiments, the NVM interface can assume that the file system is issuing skip-sequential writes.

Data block 502 can be the same as or similar to data blocks 304 (FIG. 3) and 402 (FIG. 4), and may include data for all sectors of a logical block. Data block 504 may have previously been an empty block of a NVM, which is now being used to store new data. Similar to data block 402 (FIG. 4) and log block 404 (FIG. 4), although data blocks 502 and 504 may correspond to the same logical block, the two blocks can be located in two different physical locations on the NVM.

Write queue 506 can illustrate the stream of new data that is received from the file system. Persons skilled in the art will appreciate that write queue 506 is only shown for the sake of illustration, and that the NVM interface may not actually keep track of newly received data in a write queue.

To reach the state shown in FIG. 5, at time $t_0$, the NVM interface may have received a write command from the file system to write data to sector 0 with logical address 0. In response to receiving this write command, the NVM interface can sequentially program new data corresponding to sector 0 to page 0 of data block 504.

Then, for each subsequent logical address received from the file system, the NVM interface can determine if one or more conditions have been satisfied and, as a result, detect whether the file system is issuing non-skip-sequential writes. For example, the NVM interface can determine whether a logical address provided by the file system continues to be skip-sequential. As mentioned previously, "skip-sequential" can refer to a scenario where a logical address provided by a system is strictly greater than the logical address of a last programmed page, but the provided logical addresses are not in an absolute sequential order. As used herein, a "last programmed page" can refer to a page in a block (e.g., data block 504) that was most recently programmed. That is, immediately following the programming of data corresponding to sector 0, the last programmed page is page 0.

For example, the NVM interface can detect if the system is issuing non-skip-sequential writes by determining whether the logical address of a sector provided by the file system is lower than or the same as the logical address of the sector corresponding to the last programmed page. A logical address can be lower than a previous logical address if the logical address has a smaller LBA or a smaller logical page address.

In the example shown in FIG. 5, at time $t_1$, the NVM interface may have received a write command to write data to sector 1 with logical address 1. In response to receiving this write command, the NVM interface can determine if logical address 1 of sector 1 is lower than or the same as logical address 0 of sector 0. Since logical address 1 is not lower than or the same as logical address 0, the NVM interface can determine that the one or more conditions have not been satisfied. As a result, the NVM interface can sequentially program data corresponding to sector 1 to page 1 of data block 504. This sequential programming process can continue until sector 17 has been programmed into data block 504 at time $t_{17}$. Thus, in some embodiments, sectors 0-17 can be those sectors of the logical block that have not previously been allocated to other files (e.g., free sectors in region 310 of logical block 302 of FIG. 3).

At time $t_{18}$, the NVM interface may receive a write command from the file system to program data to sector 35. Since logical address 35 of sector 35 is not lower than or the same as logical address 17 of sector 17, which corresponds to the last programmed page (e.g., page 17), the NVM interface can sequentially program data corresponding to sector 35 to data block 504.

However, in order to perform sequential programming, the NVM interface may need to perform an in-place merge of a subset of the pages of data block 502 (e.g., pages corresponding to sectors with logical addresses that are above logical address 17 and below logical address 35) with respective pages of data block 504. In some embodiments, these sectors of data can be regions of the logical block that have already been allocated to one or more files (e.g., one or more media files) stored on the device. For instance, these sectors can be pre-allocated sectors in region 306 of logical block 302 (FIG. 3).

To perform an in-place merge, the NVM interface can sequentially copy sectors of data from pages 18-34 of data block 502 to pages 18-34 of data block 504. As a result, instead of waiting to perform data merges until data block 504 needs to be reclaimed, the NVM interface can sequentially pre-merge the gap between pages 17 and 35 of data block 504.

In response to determining that the copying has completed, the NVM interface can program data corresponding to sector 35 to data block 504. After programming the data, the NVM interface may continue to sequentially program new data until sector 41 has been programmed to data block 504. Similar to sectors 0-17, sectors 35-41 can be those sectors of the logical block that have not previously been allocated to other files (e.g., free sectors in region 311 of logical block 302 of FIG. 3).

After programming sector 41, the NVM interface can continue to alternate between performing in-place merges for various sectors (e.g., sectors 42-95 and sectors 102-124) and programming new data to other sectors (e.g., sectors 96-101 and sectors 125-127) until all pages of data block 504 have been programmed. After completing the programming of data block 504, data block 504 can be automatically transformed to a new data block that is associated with the logical block. Accordingly, the data stored in data block 502 can be erased. Data block 502 can thus become an erased block that is available for reprogramming.

Although the NVM interface can perform sequential programming by default, various conditions may trigger the NVM interface to switch to an alternative programming state in order to handle non-skip-sequential writes. For example, FIG. 6 is an illustrative graphical view 600 of programming in multiple programming states.

As shown in FIG. 6, data block 602 may include data for all sectors of a logical block, and may be the same as or similar to data block 304 (FIG. 3), data block 402 (FIG. 4), and data block 502 (FIG. 5). Block 604 may have previously been an empty block of the NVM that is being used to store new data. Thus, although data block 602 and block 604 may correspond to the same logical block, the two blocks can be located in two different physical locations in the NVM.

Write queue 606 can illustrate the stream of new data that is received from a file system (e.g., a file system stored on the device itself or a file system stored on a host device). Persons skilled in the art will appreciate that write queue 606 is only shown for the sake of illustration, and that the NVM interface may not actually keep track of the newly received data in a write queue.

To reach the state shown in FIG. 6, at time $t_0$, an NVM interface (e.g., NVM interface 118 of FIG. 1 or NVM interface 218 of FIG. 2) may have received a write command from the file system to write data to sector 4. In response to receiving this write command, the NVM interface can begin by sequentially programming data to pages 0-3 of block 604 prior to programming data corresponding to sector 4.

For example, the NVM interface can perform an in-place merge of a subset of the pages of data block 602 (e.g., pages corresponding to sectors with logical addresses 0-3) with respective pages of block 604. In particular, the NVM interface can sequentially copy sectors of data located in pages 0-3 of data block 602 to block 604. After determining that the copying has completed, the NVM interface can program data corresponding to sector 4 to page 4 of block 604.

Then, at time $t_1$, the NVM interface may receive a write command from the file system to write data to sector 16. In response to receiving this write command, the NVM interface can determine if one or more conditions have been satisfied. For example, the NVM interface can determine whether the logical address provided by the file system continues to be skip-sequential. For instance, the NVM interface can determine that logical address 16 of sector 16 is not lower than or the same as logical address 4 of sector 4, which corresponds to the last programmed page (e.g., page 4). As a result, the NVM interface can determine that the one or more conditions have not been satisfied, and therefore can continue to sequentially program data to block 604.

The NVM interface can sequentially program data by performing an in-place merge. For example, prior to programming data corresponding to sector 16 to block 604, the NVM interface can sequentially copy sectors of data located in pages 5-15 of data block 602 to block 604, thereby sequentially pre-merging the gap between pages 4 and 16 of block 604. In response to determining that the copying has completed, the NVM interface can program data corresponding to sector 16 to block 604.

Then, at time $t_2$, the NVM interface may receive another write command from the file system to write data to sector 4. In response to receiving this write command, the NVM interface can determine if one or more conditions have been satisfied. For example, the NVM interface can determine that the one or more conditions have been satisfied (e.g., the logical address provided by the file system is no longer skip-sequential) by detecting that logical address 4 of sector 4 is lower than logical address 16 of sector 16, which corresponds to the last programmed page (e.g., page 16). In some cases, this can occur if the file system is re-writing a previously written sector during a particular time period (e.g., an application of the device re-writes a particular file between times $t_o$ and $t_2$).

Based on this determination, the NVM interface can switch to an alternative programming state. For example, the NVM interface can begin to use block 604 as a log block by programming the remaining sectors of data received from the file system to one or more pages of block 604 (e.g., pages 17-23) in the order that the data is received.

At some later point in time, the NVM interface may perform a merge of data block 602 and block 604 in response to determining that block 604 needs to be reclaimed. This process may be similar to the merge process described in FIG. 4. After merging data block 602 with block 604 and copying the newest version of data to a third block (not shown), the NVM interface can erase data block 602 and block 604.

In some embodiments, in order to avoid eventually having to switch to an alternative programming state (as illustrated in FIG. 6), it may be preferable for the NVM interface to first determine whether a write preference of a system is skip-sequential before writing data to a block (discussed in connection with FIG. 7). This way, the NVM interface can select either to perform in-place merges (as illustrated in FIG. 5) or maintain a log block and wait to merge data until the log block needs to be reclaimed (as illustrated in FIG. 4).

Figure 7:
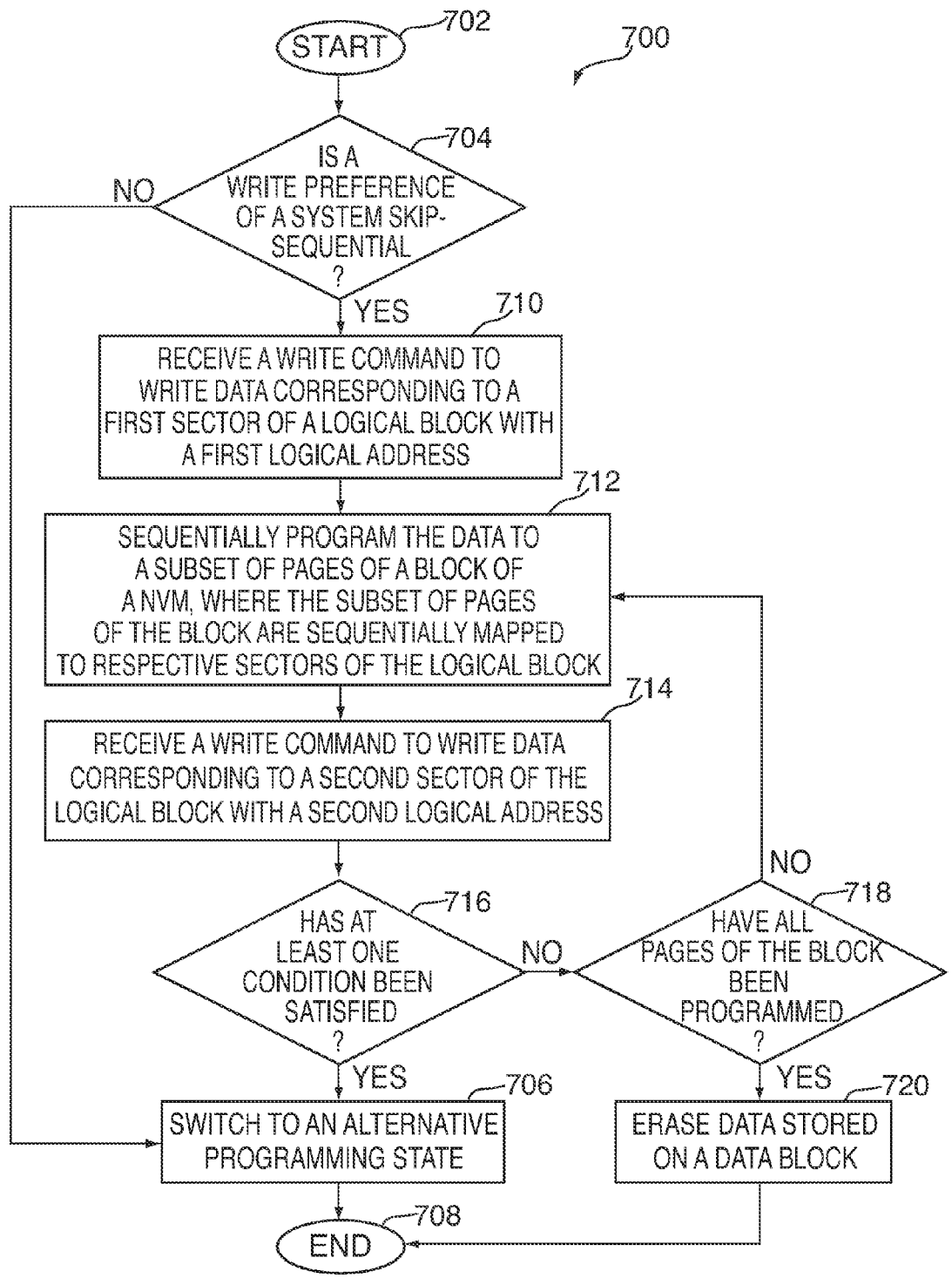
FIG. 7 is a flowchart of an illustrative process for switching between programming states in accordance with various embodiments of the invention.

Referring now to FIG. 7, a flowchart of illustrative process 700 is shown for switching between programming states. The steps of process 700 may be executed by a memory interface for any suitable electronic device or system, such as by NVM interface 118 of electronic device 100 (FIG. 1) or NVM interface 218 of electronic device 200 (FIG. 2).

Process 700 may begin at step 702, where the memory interface may receive a write command to write data associated with a file to a NVM (e.g., NVM 120 of FIG. 1 or NVM 220 of FIG. 2). For example, the memory interface may receive the write command from a file system (e.g., a file system stored on the device itself or a file system stored on a host device).

At step 704, in response to receiving the write command, the memory interface can determine whether a write preference of the system is skip-sequential. A write preference can indicate the type of data that is being stored. For example, for streaming applications, the write preference can be skip-sequential. For other types of applications (e.g., writes caused by FAT updates), the write preference can be non-skip-sequential. By monitoring the write preference of the system, the memory interface can provide for exceptions to a default state of programming sequentially to the NVM. For example, an exception can be made if the write command is associated with FAT updates.

A file system can provide the write preference to the memory interface in any number of ways. For example, in a system where the writes are generated by an application stored on the electronic device itself, the communication protocol between the file system and the memory interface can be modified to provide for a write preference. In particular, a flag bit associated with each file that is being written can be adjusted based on the write preference. Alternatively, a mode of the memory interface can be adjusted based on the write preference. In some embodiments, upon detecting that the flag bit associated with a file or the mode of the memory interface is set to skip-sequential writes, the memory interface can determine that the write preference of the system is skip-sequential.

As another example, in a system where the file system is stored on a host device, the communication protocol between the file system and the memory interface may not be able to be modified. As a result, files received from particular applications in these systems will not be associated with flag bits, or alternatively, these systems may generally select not to implement flag bits. In such cases, the memory interface can setup a default programming mode by assuming that the write preference of the system is skip-sequential if the memory interface does not detect a flag bit associated with a file.

If, at step 704, the memory interface determines that the write preference of the system is not skip-sequential, process 700 may move to step 706. For example, the memory interface can determine that the write preference of the system is not skip-sequential by detecting that the write command is associated with FAT updates. As another example, the memory interface may determine that the write preference of the system is not skip-sequential based on detecting that a flag bit associated with the file is set to non-skip-sequential writes, detecting that a mode of the memory interface is set to non-skip-sequential writes, any other suitable approach, and/or any combination thereof.

At step 706, the memory interface can switch to an alternative programming state. While operating in the alternative programming state, the memory interface can maintain a log block and program data to the pages of the log block in the order that the data is received. In addition, the memory interface can perform a merge between the log block and a data block once the log block needs to be reclaimed (e.g., similar to the process described in FIG. 4). Process 700 may then end at step 708.

Referring back to step 704, if the memory interface instead determines that the write preference of the system is skip-sequential, process 700 may move to step 710. The memory interface may determine that the write preference of the system is skip-sequential based on, for example, detecting that a flag bit associated with the file is set to skip-sequential writes, detecting that no flag bit is associated with the file, detecting that a mode of the memory interface is set to skip-sequential writes, any other suitable approach, and/or any combination thereof.

At step 710, the memory interface can receive a write command to write data corresponding to a first sector of a logical block (e.g., logical block 302 of FIG. 3) with a first logical address (e.g., sector 4 with logical address 4). At step 712, the memory interface can sequentially program the data to a subset of the pages of a block, where the subset of pages can be sequentially mapped to respective sectors of the logical block. In particular, a portion of the subset of the pages (e.g., a first set of pages) may correspond to previously free sectors of the logical block (e.g., free sectors in regions 310-313 of logical block 302 of FIG. 3) that have been allocated to the file that is currently being written (e.g., a new media file generated by an application).

In some embodiments, the memory interface can sequentially program data by pre-merging gaps between the first set of pages of the block (e.g., gaps formed between pages 0 and 4 and between pages 4 and 16 of block 604 of FIG. 6) with data from one or more pages of a data block (e.g., pages 0-3 and 5-15 of data block 602 of FIG. 6). In some cases, these pages of the data block can correspond to sectors of the logical block (e.g., sectors in regions 306-308 of logical block 302 of FIG. 3) that have been pre-allocated to at least one other file.

For example, prior to programming data corresponding to the first sector, the memory interface can sequentially copy sectors of data (e.g., sectors 0-3) from one or more pages of the data block (e.g., pages 0-3 of data block 602 of FIG. 6) to respective pages of the block (e.g., pages 0-3 of block 604 of FIG. 6). In particular, the sectors of data that are copied can have logical addresses (e.g., logical addresses 0-3) that are lower than the first logical address of the first sector (e.g., logical address 4 of sector 4). The memory interface can then program the data corresponding to the first sector to a respective page of the block (e.g., page 4 of block 604 of FIG. 6).

Continuing to step 714, the memory interface can receive a write command to write data corresponding to a second sector of the logical block with a second logical address. At step 716, the memory interface can determine whether at least one condition has been satisfied. For example, in response to determining that the at least one condition has been satisfied, the memory interface can determine that non-skip-sequential writes are being received from the file system.

In some embodiments, the memory interface can determine whether the at least one condition has been satisfied by detecting if a logical address of the data to be written is lower than or the same as a logical address corresponding to a last programmed page (e.g., if a sector currently being written to is lower than or the same as a sector corresponding to the last programmed page). For example, in response to receiving a write command to write data corresponding to sector 16 with logical address 16, the memory interface can detect that logical address 16 is not lower than or the same as the logical address corresponding to the last programmed page (e.g., sector 4 with logical address 4), and can therefore determine that the at least one condition has not been satisfied.

If, at step 716, the memory interface determines that the at least one condition has not been satisfied, process 700 may move to step 718. At step 718, the memory interface can determine if all pages of the block have been programmed.

If, at step 718, the memory interface determines that all pages of the block have not been programmed, process 700 may return to step 712. At step 712, the memory interface can continue to sequentially program the data to the remaining pages of the block.

If, at step 718, the memory interface instead determines that all pages of the block have been programmed, process 700 may move to step 720. At step 720, the memory interface can erase data stored on a data block (e.g., data block 502 of FIG. 5 or data block 602 of FIG. 6). As a result, the data block can become an erased block that is available for reprogramming.

Referring back to step 716, if the memory interface instead determines that the at least one condition has been satisfied (e.g., a sector currently being written to is lower than or the same as a sector corresponding to the last programmed page), process 700 may move to step 706. For example, in response to receiving a write command to write data that corresponds to sector 4 with logical address 4, the memory interface can detect that logical address 4 is lower than the logical address corresponding to the last programmed page (e.g., sector 16 with logical address 16), and therefore determine that the at least one condition has been satisfied.

Then, at step 706, the memory interface can switch to an alternative programming state. In particular, the memory interface can stop programming data sequentially to the subset of the pages of the block and pre-merging the data. Instead, the memory interface can use the block as a log block, and program the data corresponding to the second sector to a page of the block. For example, the memory interface can program data corresponding to sector 4 to page 17 of block 604 (FIG. 6). Moreover, the memory interface can begin to program data to the remaining pages of the block in the order that the data is received. Process 700 may then end at step 708.

It should be understood that process 700 of FIG. 7 is merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for sequentially programming a non-volatile memory ("NVM"), the method comprising:
   determining whether a write preference of a file system is skip-sequential before writing any data to a first block of the NVM, wherein skip-sequential writes occurs when each logical address that is received is greater than the logical address of the last sector written to a block, but the received logical addresses are not in an absolute sequential order, wherein the determining comprises detecting that a flag bit associated with the data is set to skip-sequential writes;
   in response to determining that the write preference of the file system is skip-sequential, sequentially programming data to pages of the first block, wherein a last programmed page corresponds to a first sector of a logical block;
   receiving a write command from the file system to write data corresponding to a second sector of the logical block;
   determining if a second logical address of the second sector is lower than or the same as a first logical address of the first sector; and
   in response to determining that the second logical address of the second sector is not lower than or the same as the first logical address of the first sector, sequentially programming data from a data block to the pages of the first block prior to programming the second sector of data to the first block.

2. The method of claim 1, wherein in response to determining that the second logical address of the second sector is lower than or the same as the first logical address of the first sector, switching to an alternative programming state, wherein the switching comprises programming the data corresponding to the second sector received from the file system to the first block.

3. The method of claim 1, wherein sequentially programming the data from the data block to the pages of the first block comprises sequentially copying sectors of data from a portion of pages of the data block to the first block, wherein the sectors of data have logical addresses that are above the first logical address and below the second logical address.

4. The method of claim 3, wherein the sectors with logical addresses that are above the first logical address and below the second logical address are regions of the logical block that have already been allocated by the file system.

5. The method of claim 3, wherein the second sector is from a region of the logical block that has not previously been allocated to other files.

6. The method of claim 3, further comprising:
   determining that the copying has completed; and
   programming the data corresponding to the second sector received from the file system to the first block.

7. A system comprising:
   a file system for allocating sectors of a logical block to at least one file; and
   a memory interface for accessing a non-volatile memory ("NVM"), the memory interface comprising:
      a bus controller for communicating with the non-volatile memory; and
      control circuitry operative to:
         receive a write command from the file system to write data associated with the at least one file to the NVM;
         determine whether a write preference of the system is skip-sequential before writing any data to a first block of the NVM, wherein the write preference is based on detecting that a flag bit associated with the at least one file is set to skip-sequential writes, and wherein skip-sequential occurs when each logical address that is received is greater than the logical address of the last sector written to a block, but the received logical addresses are not in an absolute sequential order; and
         in response to determining that the write preference of the system is skip-sequential, direct the bus controller to program the data sequentially to a first set of pages of the first block, wherein the first set of pages of the first block are sequentially mapped to respective sectors of the logical block allocated to the at least one file.

8. The system of claim 7, wherein the control circuitry is operative to determine that the write preference of the system is skip-sequential based on detecting that no flag bit is associated with the at least one file.

9. The system of claim 7, wherein the control circuitry is operative to determine that the write preference of the system is skip-sequential based on detecting that a mode of the memory interface is set to skip-sequential writes.

10. The system of claim 7, wherein in response to determining that the write preference of the system is not skip-sequential, the control circuitry is further operative to direct the bus controller to program the data to pages of the first block in the order that the data is received.

11. The system of claim 10, wherein the control circuitry is operative to determine that the write preference of the system is not skip-sequential based on detecting that the write command is associated with file allocation table updates.

12. The system of claim 7, wherein the NVM further comprises a data block, the data block comprising pages sequentially mapped to the sectors of the logical block, and wherein the control circuitry is operative to direct the bus controller to pre-merge gaps between the first set of pages of the first block with data from at least a portion of the pages of the data block.

13. The system of claim 12, wherein the at least a portion of the pages correspond to sectors in the logical block that have been pre-allocated to at least one other file.

14. The system of claim 12, wherein the control circuitry is operative to:

detect that a sector currently being written to in the logical block is lower than or the same as a sector corresponding to a last programmed page; and direct the bus controller to stop programming the data sequentially to the first set of pages.

15. The system of claim 14, wherein the control circuitry is further operative to direct the bus controller to program the data to pages of the first block in the order that the data is received.

16. The system of claim 15, wherein the control circuitry is further operative to:

determine that the first block needs to be reclaimed; and direct the bus controller to perform a merge of the first block and the data block.

* * * * *

UNITED STATES PATENT AND TRADEMARK OFFICE
CERTIFICATE OF CORRECTION

PATENT NO. : 8,850,160 B2  
APPLICATION NO. : 12/861687  
DATED : September 30, 2014  
INVENTOR(S) : Daniel J. Post et al.

Page 1 of 1

It is certified that error appears in the above-identified patent and that said Letters Patent is hereby corrected as shown below:

On the Title Page

In Column 1, Item 51, under "Int. Cl.", delete " *G06F 12/00    (2006.01)*  
*G06F 12/02    (2006.01)* "

and insert -- *G06F 12/00    (2006.01)* --, therefor.

Signed and Sealed this  
Twenty-eighth Day of July, 2015

Michelle K. Lee  
*Director of the United States Patent and Trademark Office*